United States Patent [19]
Springer et al.

[11] Patent Number: 5,868,455
[45] Date of Patent: Feb. 9, 1999

[54] VEHICLE DOOR PANEL WITH INTEGRAL HANDLE AND METHOD OF MANUFACTURE

[75] Inventors: Rob E. Springer, Grandville; Dennis J. Beard; David J. Phillips, both of Holland, all of Mich.

[73] Assignee: Prince Corporation, Holland, Mich.

[21] Appl. No.: 706,168

[22] Filed: Aug. 30, 1996

[51] Int. Cl.$^6$ .............. B32B 5/20; B32B 31/18; B60J 5/04

[52] U.S. Cl. .............. 296/146.1; 156/78; 156/213; 156/218; 156/251; 156/267; 156/275.1; 156/308.4; 296/146.7

[58] Field of Search .................. 156/212, 214, 156/285, 78, 91, 245, 213, 217, 218, 251, 267, 275.1, 308.4; 296/153, 146.6, 146.1, 146.7; 49/502

[56] References Cited

U.S. PATENT DOCUMENTS

| | | |
|---|---|---|
| 3,040,832 | 6/1962 | Wilfert . |
| 3,059,281 | 10/1962 | Visser et al. . |
| 3,068,044 | 12/1962 | Wilfert ................................. 296/153 |
| 3,123,403 | 3/1964 | Hood . |
| 3,355,535 | 11/1967 | Hain et al. . |
| 3,467,741 | 9/1969 | Kesling . |
| 3,528,866 | 9/1970 | Stevens . |
| 3,738,903 | 6/1973 | Berwick et al. . |
| 3,772,111 | 11/1973 | Ginsburg . |
| 3,927,161 | 12/1975 | Powell et al. . |
| 4,016,230 | 4/1977 | Michel ................................... 264/89 |
| 4,016,315 | 4/1977 | Szabo . |
| 4,021,072 | 5/1977 | Belanger . |
| 4,174,988 | 11/1979 | Moore et al. . |
| 4,248,646 | 2/1981 | Ginsburg . |
| 4,350,544 | 9/1982 | Matsuno . |
| 4,420,447 | 12/1983 | Nakashima . |
| 4,459,331 | 7/1984 | Brix et al. . |
| 4,572,856 | 2/1986 | Gembinski . |

(List continued on next page.)

FOREIGN PATENT DOCUMENTS

| | | |
|---|---|---|
| 0187990 A2 | 7/1986 | European Pat. Off. . |
| 0408282 B1 | 1/1991 | European Pat. Off. . |
| 1127068 | 4/1962 | Germany . |
| 3236405 A1 | 4/1984 | Germany . |
| 288335 | 3/1990 | Japan . |
| 691677 | 4/1994 | Japan . |
| 717885 | 11/1954 | United Kingdom . |

*Primary Examiner*—Richard Crispino
*Attorney, Agent, or Firm*—Price, Heneveld, Cooper, DeWitt & Litton

[57] ABSTRACT

A door panel includes a support having a formed area with opposing spaced apart structures and an elongated reinforcement spanning between the opposing spaced apart structures and spaced from the formed area. A flexible cover is positioned on the support including a main panel section covering the support and covering the formed area, and a second panel section wrapped around the reinforcement for covering the reinforcement to form a handle on the door panel. As molded, the flexible cover includes inner, middle, and outer panel sections that are spaced apart to facilitate molding. The outer panel section is convexly shaped and can be inverted so that it abuts the middle panel section. The door panel is constructed by positioning the flexible cover on the support, and flexing the outer panel section inwardly so that a handle-covering portion of the flexible cover completely surrounds the reinforcement. Thereafter, the flexible cover is RF welded so that the reinforcement is covered and so that a portion of the flexible cover can be removed to form an opening under the handle. Then, flexible foam is injected between the support and the flexible cover. Modifications are disclosed wherein the support is constructed from a smaller support section attached to a larger support section, wherein a rigid foam forms the entire support, and wherein the reinforcement is a loop of stiff material attached to a support.

33 Claims, 7 Drawing Sheets

U.S. PATENT DOCUMENTS

| | | |
|---|---|---|
| 4,659,135 | 4/1987 | Johnson . |
| 4,662,115 | 5/1987 | Ohya et al. . |
| 4,734,230 | 3/1988 | Rhodes, Jr. et al. . |
| 4,738,809 | 4/1988 | Storch . |
| 4,793,793 | 12/1988 | Swenson et al. . |
| 4,831,710 | 5/1989 | Katoh et al. . |
| 4,849,277 | 7/1989 | Jaklofsky . |
| 4,890,877 | 1/1990 | Astiani-Zarandi et al. . |
| 4,891,081 | 1/1990 | Takahashi et al. . |
| 4,900,493 | 2/1990 | Bartels et al. . |
| 4,902,362 | 2/1990 | Stewart et al. . |
| 4,908,170 | 3/1990 | Kurimoto . |
| 4,949,508 | 8/1990 | Elton . |
| 4,971,645 | 11/1990 | Licus . |
| 4,992,224 | 2/1991 | Swenson et al. . |
| 5,013,508 | 5/1991 | Troester . |
| 5,037,687 | 8/1991 | Kargarzadeh et al. . |
| 5,071,605 | 12/1991 | Kawaguchi et al. . |
| 5,073,318 | 12/1991 | Rohrlach et al. . |
| 5,082,609 | 1/1992 | Rohrlach et al. . |
| 5,104,596 | 4/1992 | Kargarzadeh et al. . |
| 5,125,815 | 6/1992 | Kargarzadeh et al. . |
| 5,127,191 | 7/1992 | Ohta . |
| 5,173,228 | 12/1992 | Kargarzadeh et al. . |
| 5,230,855 | 7/1993 | Kargarzadeh et al. . |
| 5,252,164 | 10/1993 | Mills ........................ 156/212 |
| 5,462,482 | 10/1995 | Grimes . |
| 5,462,786 | 10/1995 | Van Ert . |
| 5,573,617 | 11/1996 | Franck et al. . |
| 5,601,889 | 2/1997 | Chundury et al. ..................... 428/34.3 |

FIG. 16

VEHICLE DOOR PANEL WITH INTEGRAL HANDLE AND METHOD OF MANUFACTURE

BACKGROUND OF THE INVENTION

The present invention relates to a vehicle inner door panel having an integral handle adapted for closing the door.

Modern vehicles include passenger doors with vehicle inner door panels trimmed to match the passenger compartment decor. The door panels each include an inner door handle for closing the associated door. Recently, some manufacturers have reduced the number of parts required to construct a door panel by providing an integral handle, thus reducing cost and assembly time, and also providing a cleaner appearance with less visible joint lines. However, further improvement is desired over known door panel systems.

U.S. Pat. No. 5,037,687 discloses a door panel having a relatively flat reinforcement insert, a reinforcement strip attached to an interior surface of the reinforcement insert, and a skin with a first section for aesthetically covering the interior surface and a tubular section for covering the reinforcement strip to form a handle. However, the tubular section disclosed in Patent '687 is difficult and inefficient to manufacture and still further is inefficient to assemble. For example, the reinforcement strip must be snaked through the tubular section and then attached to the flat reinforcement insert member during assembly, which is cumbersome and labor intensive. Further, the screws used to connect the ends of the reinforcement strip to the generally flat reinforcement insert member are separate "extra" pieces requiring installation. Also, the screws are subject to improper installation, such as overtorquing which results in stripping, or undertorquing which results in incomplete installation and looseness. Also, screws can work loose with time and use, resulting in a loose door handle. The '687 patent also discloses a method for manufacturing a skin including the tube section for the handle. But the mold for forming the skin with the handle tube section includes a plug that is manipulated in the mold to form the skin handle tube. Use of the plug results in a process that is labor intensive and has a poor cycle efficiency. Still further, the plug and mold must be carefully maintained to prevent unacceptable weld lines from being formed on the skin, which occurs if the plug is mislocated during the molding process or if the plug becomes worn. Thus, a door panel solving the aforementioned problems is desired.

SUMMARY OF THE INVENTION

In one aspect of the present invention, a vehicle door panel includes a support having a formed area with opposing spaced apart structures and an elongated reinforcement spanning between the opposing spaced apart structures and spaced from the formed area. The door panel further includes a flexible cover having a support-covering section covering the formed area and a handle-covering panel section wrapped around the reinforcement. The handle-covering panel section is held together along its edges with welded material to form a tubular covering that surrounds the reinforcement to thus form an integral covered handle on the door panel. In a preferred form the welded material comprises an RF welded material forming a substantially smooth weld line.

In another aspect, a method includes forming a flexible cover panel, the cover panel having inner, middle, and outer panel sections spaced from each other but located in a generally sandwich like arrangement, one of the cover panel sections being concavely shaped. The method further includes flexing the one cover panel section inside-out so that the one cover panel section becomes concavely shaped in an opposite direction and so that it abuts an adjacent one of the other cover panel sections. The method further includes securing the one cover panel section to the other adjacent cover panel section along a joinder line to form a covered handle on the cover panel.

Such construction and method overcomes the difficulty of the prior art and results in a door panel and integral handle. These and other features and advantages of the present invention will be further understood and appreciated by those skilled in the art by reference to the following specification, claims, and appended drawings.

DETAILED DESCRIPTION OF PREFERRED EMBODIMENT

Figure 1:
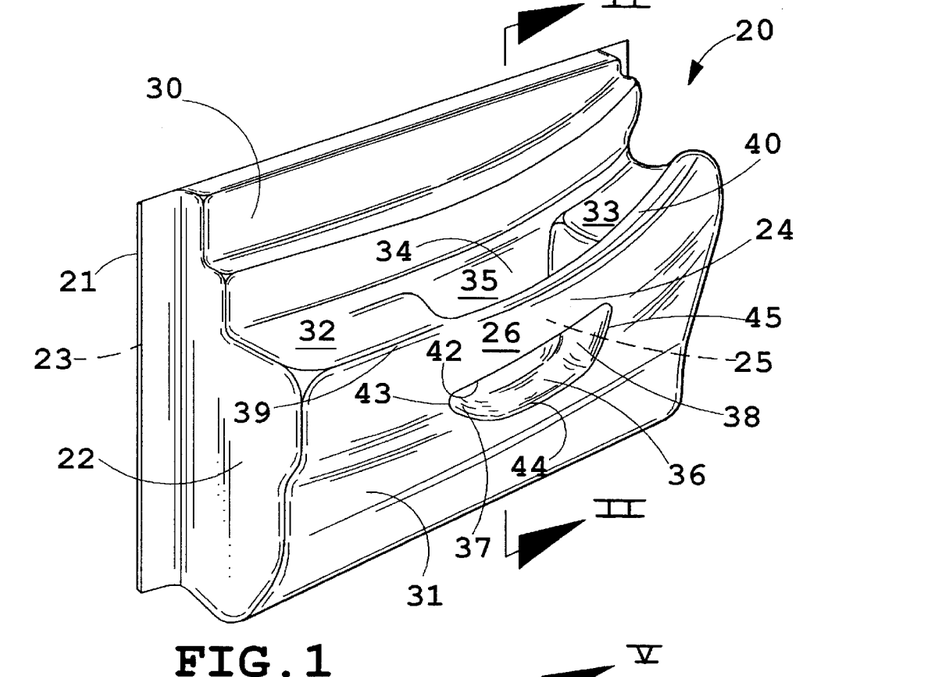
FIG. 1 is a perspective view of door panel embodying the present invention.

For purposes of description herein, the terms "upper," "lower," "right," "left," "rear," "front," "vertical," "horizontal," and derivatives thereof shall relate to the invention as oriented in FIG. 1 with the inside of the door panel being the side having a handle thereon and the front being toward the left in FIG. 1. However, it is to be understood that the invention may assume various alternative orientations, unless expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIG. 1, there is a door panel 20 shown embodying the present invention. Panel 20 includes a sheet-like back support 21, an aesthetic vinyl cover or skin 22 covering the interior side of the support 21, and an intermediate layer of resilient foam 23 including handle-filling foam 23' (FIG. 2) extending between the generally planar support 21 and the cover 22. A reinforcement member 25 (FIG. 2) is integrally formed on back support 21, and the cover 22 includes an integral handle-covering tubular portion 24 for covering the integral reinforcement or bridge member 25 defining an integral handle 26 on the door panel 20. Handle-covering portion 24 of cover 22 extends completely around reinforcement 25 along its full length. The handle-covering portion 24 includes a weld line of RF welded material that extends longitudinally along a hidden side of handle 26, the weld line being characteristically relatively smooth and non-objectionable to a person's touch and its appearance is clean and uncluttered. The support 21, cover 22, and foam 23 of door panel 20 are characterized by few integrated parts, and further are characterized by an assembly that minimizes use of fasteners such as screws or manual labor during assembly.

Door panel 20 (FIG. 1) includes an upper section 30 and a lower section 31 connected by front and rear shelves 32 and 33 forming a horizontally extending armrest. Shelves 32 and 33 are spaced apart by a well or recess 34 located generally in the center of door panel 20. Well 34 is defined by an inner section 35, a bottom section 36, and front and rear sections 37 and 38 respectively. Handle 26 is aligned with the outer edges 39 and 40 of shelves 32 and 33 to provide an attractive appearance, however alternative shaped, sizes, and orientations of handle 26 are contemplated to be within the scope of the present invention. The front 37 joins with shelf 32, inner section 35 and lower section 31 to form a structural stand for supporting one end of reinforcement 25, while the rear section 38 joins shelf 33, inner section 35 and lower section 31 to form a second structural stand for supporting the other end of reinforcement 25.

Support 21 is injection molded from an engineering grade polymer such as ABS, and provides the overall structure and shape to door panel 20. Cover 22 substantially completely covers the interior visible side of support 21, and provides a clean aesthetic appearance. Notably, seams, imitation stitching, and the like can be formed in cover 22 if desired. Cover 22 is a one-piece flexible sheet-like member with an initial shape which can be formed by a variety of different processes, such as by vacuum forming, a slush/slurry molding, injection molding, or in other ways known in the art. Once cover 22 is positioned on support 21, it assumes the general shape of support 21. A flexible urethane foam 23 is injected between support 21 and cover 22 while the cover 22 and support 21 are held in position between mating dies by vacuum, clamps, or other means. Foam 23 is injected between and on all sides of reinforcement 25 and handle cover tube 24 so that the handle 26 has a soft feel when a passenger grasps the handle 26 to close a vehicle door. Additional parts such as window switches, door lock switches, and related hardware can be attached to the door panel 20 to complete the panel 20 before assembly of the door panel 20 to the associated vehicle door.

Figure 2:
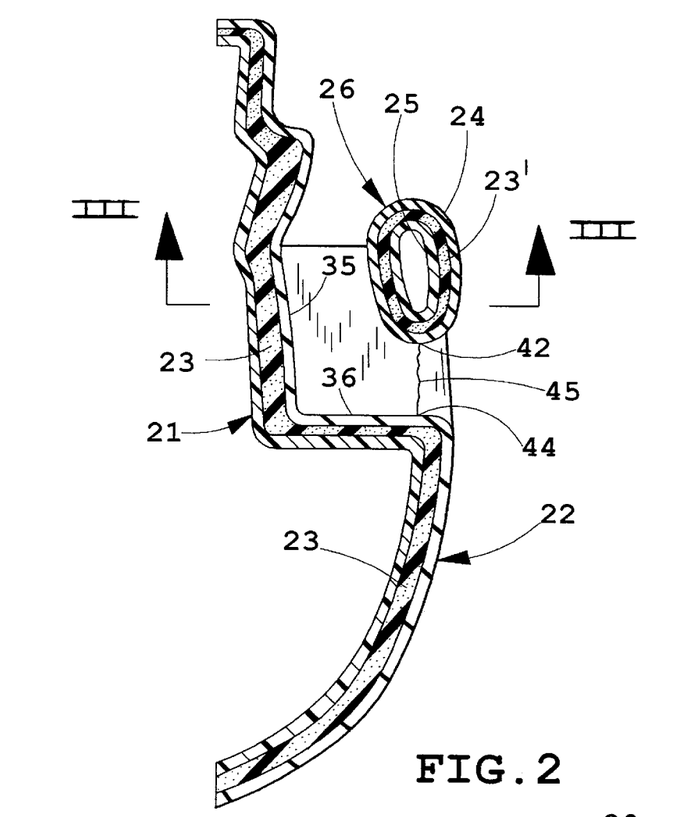
FIG. 2 is a cross sectional view taken along section line II—II in FIG. 1.
Figure 3:
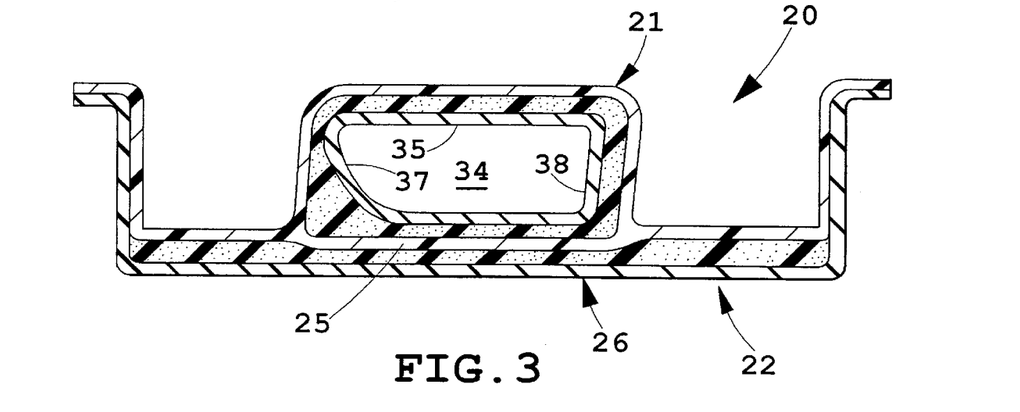
FIG. 3 is a cross sectional view taken along section line III—III in FIG. 2.
Figure 4:
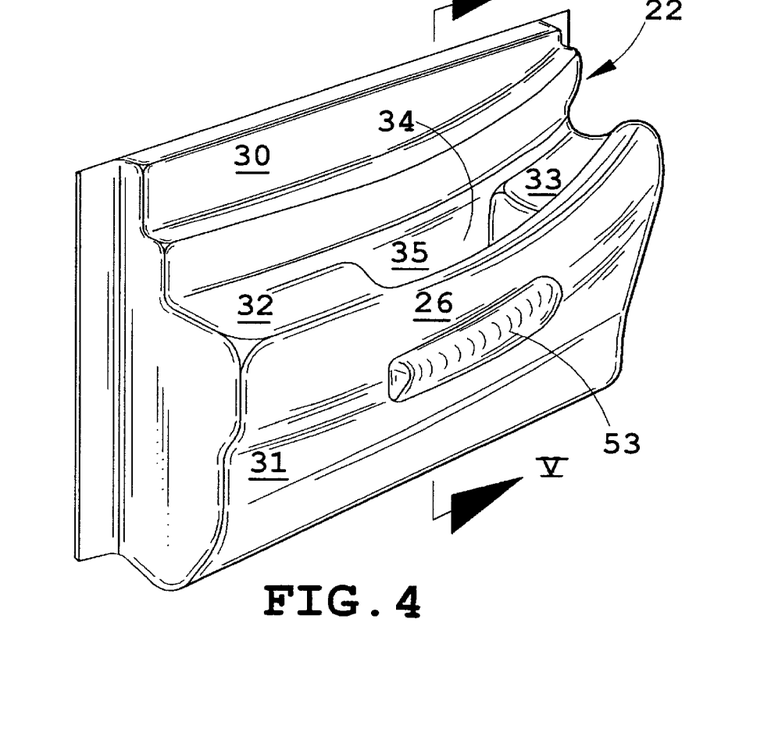
FIG. 4 is a perspective view of the cover panel shown in FIG. 1 as-molded prior to construction and showing an outwardly convexly-shaped panel section located under the handle.

One aspect of the present invention focuses on handle 26 and the RF welding process for forming handle-covering 24 around reinforcement 25. The RF welding process allows the handle 26 to be formed with a smooth seam that is unobjectionable to a person's touch, and that is generally hidden from view. In particular, an RF welded continuous strip of material 42–45 extends in a loop across the bottom of handle 26 and around well forming sections 36, 37, and 38 (FIGS. 2–3). The RF welded strip of material 42–45 provides a very smooth and non-objectionable seam. Further, minimal scrap is generated during the manufacture of parts with no extra parts or fasteners being required. Since RF welding is a known process, existing skilled labor and equipment can be employed. In the door panel 20, tubular reinforcement 25 is integrally molded as part of support 21. However, reinforcement 25 can be a solid or a hollow open cross section as shown with or without stiffening ribs therein. Where the reinforcement 25 is a tubular cross section, it is contemplated that the reinforcement can be two-piece, one part being an upwardly open U-shaped integrally-molded main portion defining an open internal cavity, and the other part being a top panel-like piece that snap attaches or is fastened along a top (or a side) of the U-shaped main section to close off the internal cavity so that the reinforcement 25 forms a continuous surface for supporting the tubular handle-covering 24 of skin 22.

The cover 22 (FIG. 5) is initially molded with first, second, and third juxtaposed and spaced apart walls 50–52. The upper part of middle wall 51 and outer wall 52 ultimately form the handle-covering tubular portion 24. Outer wall 52 includes an outwardly convexly shaped section 53. The shape of the as-molded cover 22 and its flexibility allows the cover 22 to be peeled off of and removed from the die for making the cover. Since the walls 50–52 are spaced apart, the cover 22 is not die-locked onto the tool and can be flexibly removed from the tool, even though the tool does not include moving parts such as pulls, slides, or cams to form clearance for removing the cover 22 from the tool. Thus, the tool is greatly simplified, resulting in lower initial capital investment and less maintenance.

In one method of manufacture of door panel 20, the cover 22 is placed on support 21, and the outwardly convexly-shaped section 53 is "reversed" or inverted to an inwardly flexed concavely shaped position (FIG. 6) so that it wraps around the reinforcement 25. In the door panel construction of FIG. 6, cover 22 is laid directly on support 21 with no space therebetween. Once outer section 53 is reversed or flexed to abut middle wall 51, the abutting material is RF welded along a perimeter to form weld lines 42–45. The center panels 54–55 (FIG. 10) of walls 51–52 can then be pulled and peeled away and removed by hand and discarded. The remaining seams 42–45 (FIGS. 2 and 7) are characteristically smooth and non-objectionable. Where an intermediate layer of foam 23 is injected between cover 22 and support 21 (such as shown in FIGS. 1–3), a clearance is provided between reinforcement 25 and handle cover section 24 and also generally between the cover 22 on support 21. Foam layer 23 is then injected between support 21 and cover 22 to complete the manufacture of the door panel 20. In another method of manufacture, foam layer 23 is formed on the back of cover 22 before the RF welding step. Notably, the RF welding can be performed on cover 22 through the foam layer 23 and still form acceptable weld lines 42–45.

It is noted that RF welding can be performed satisfactorily on a cover 22 made of vinyl or other flexible skin-like materials, and can also be performed on a cover including a vinyl outer skin having a foam layer adhered to a backside of the vinyl outer skin. It is contemplated that the scope of the present invention includes any welding of the skin to form a tubular handle-covering shape, whether by RF welding, sonic welding, thermal welding, or other bonding technique. It is also contemplated that the present invention includes any skin forming process where a welding or bonding process is used to form a handle-covering tubular portion on a door panel cover, whether the reinforcement is positioned in the tubular portion before or after welding or bonding, or where the reinforcement is tubular, solid or has another shape.

Figures 5, 6, 7:
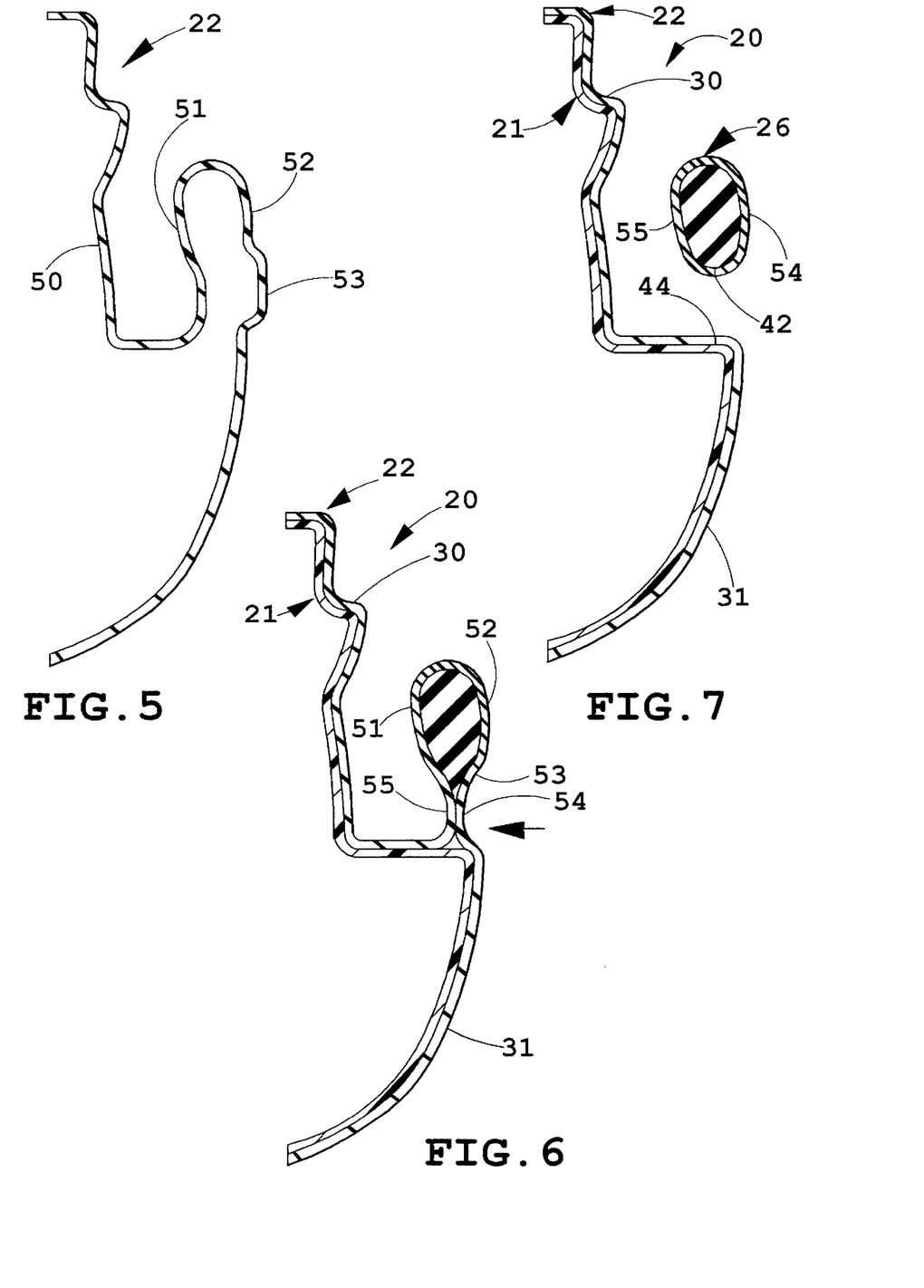
FIG. 5 is a cross sectional view taken along section line V—V in FIG. 4.
FIG. 6 is a cross sectional view comparable to FIG. 5 with the cover panel being positioned on a support and with the outwardly convexly-shaped section being flexed inside-out around the reinforcement to form an inwardly concavely shaped section that abuts the intermediate panel section.
FIG. 7 is a cross sectional view comparable to FIG. 6 in which the abutting panel sections have been RF welded and the resulting panel of waste material under the handle removed.
Figure 8:
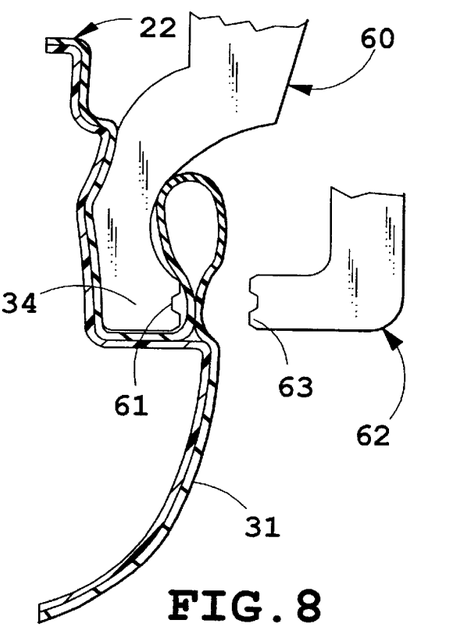
FIG. 8 is a cross sectional view comparable to FIG. 6 showing the RF welding members, with an inner most RF welding member positioned inside the well formed by the door panel cover.
Figure 9:
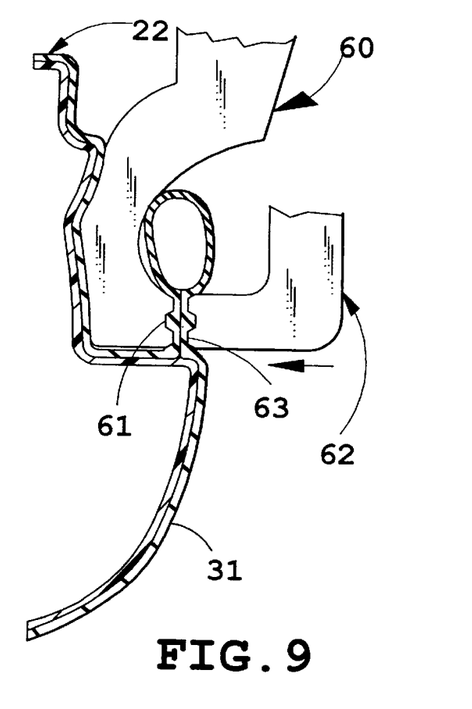
FIG. 9 is a cross sectional view comparable to FIG. 8 showing the RF welding members pressing together during the RF welding process.
Figure 10:
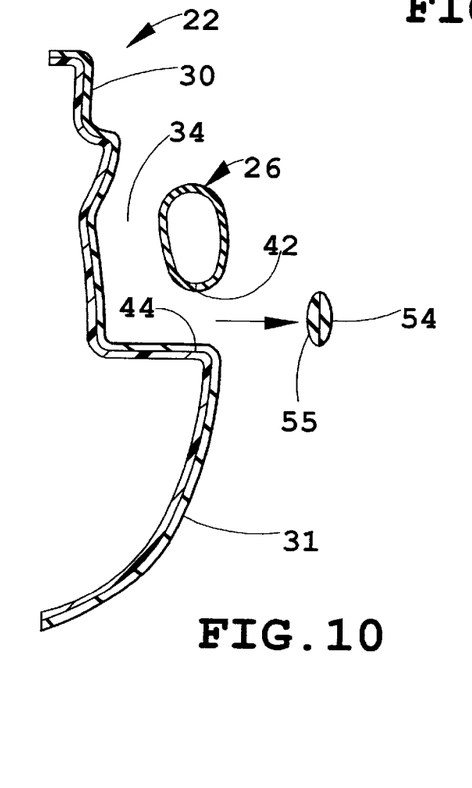
FIG. 10 is a cross sectional view comparable to FIG. 7, showing the waste material that is carved out and removed after the RF welding process illustrated in FIGS. 8 and 9.

FIGS. 8–10 illustrate the RF welding process. In FIGS. 8–10, the RF welding process is illustrated as being performed on a cover 22 that is not initially supported by a support 21, but it is to be understood that the RF welding process can be done with the support 21 being present, as shown in FIGS. 5–7. RF welding processes are generally known in the art and need not be described in detail herein for an understanding of the present invention, except as discussed below. Cover 22 is positioned on RF welding arm 60, with the arm 60 extending into well 34 (FIG. 8) and with the active end 61 of arm 60 positioned adjacent and against the wall 51. The outer wall 52 is then flexed inwardly against intermediate wall 51. A second arm 62 (FIG. 9) of the RF welding apparatus is located adjacent outer wall 52. Second arm 62 is adapted to be moved against wall 52 and includes a second active welding end 63 configured to mateably engage end 61. Ends 61 and 63 are activated with RF energy to weld the walls 51–52 together along weld lines 42–45. The welded material 42–45 bonds in a manner providing a smooth weld line and in a manner allowing the scrap panels 54–55 to be readily removed for discarding. In FIGS. 8–10, the cover 22 is RF welded to form a tubular section 24 on the cover 22 without the support 21 being present. In the illustrated example, the support 21 is later molded onto the cover 22 including molding the reinforcement 25 through the tubular section 24 (see FIGS. 15–16).

Figure 11:
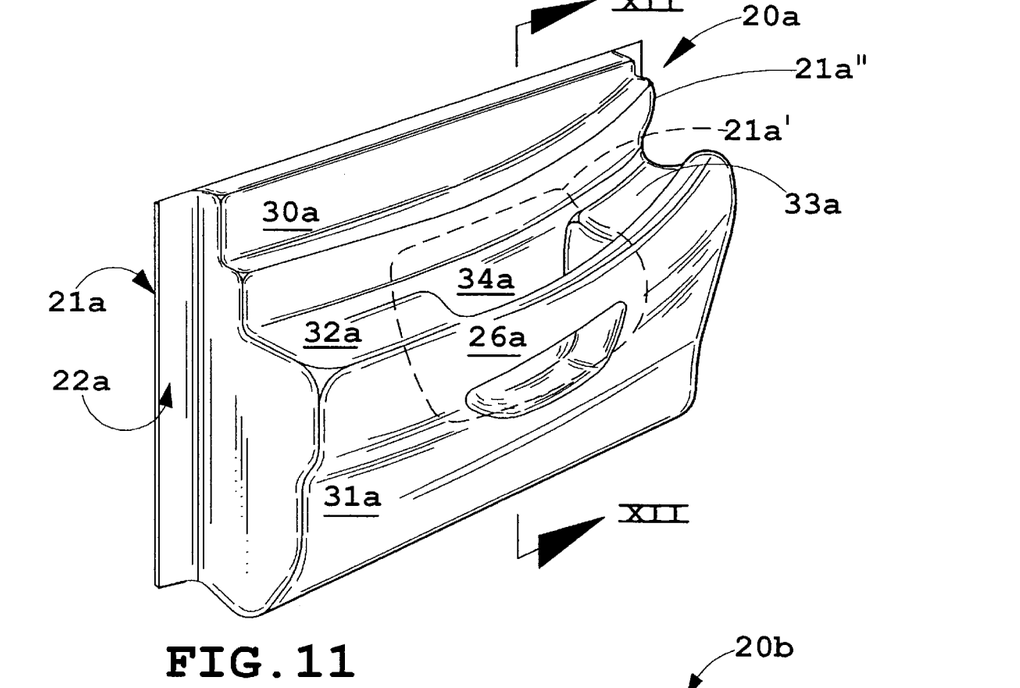
FIG. 11 is a perspective view of a modified cover panel including a smaller support panel section positioned within an enlarged support panel section.
Figure 12:
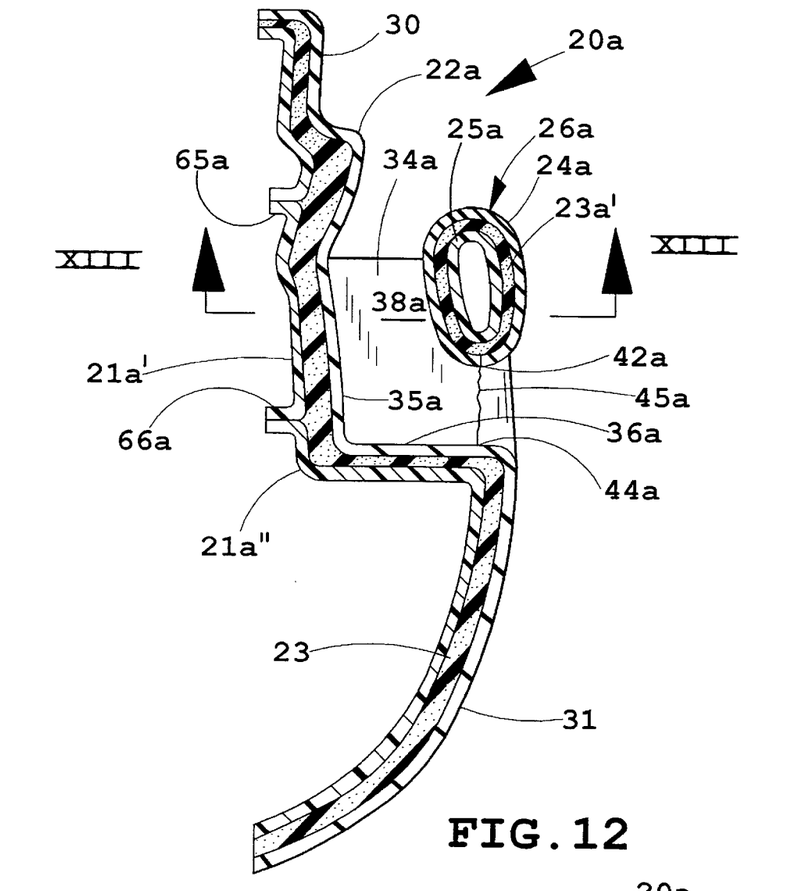
FIG. 12 is a cross sectional view taken along section line XII—XII in FIG. 11.
Figure 13:
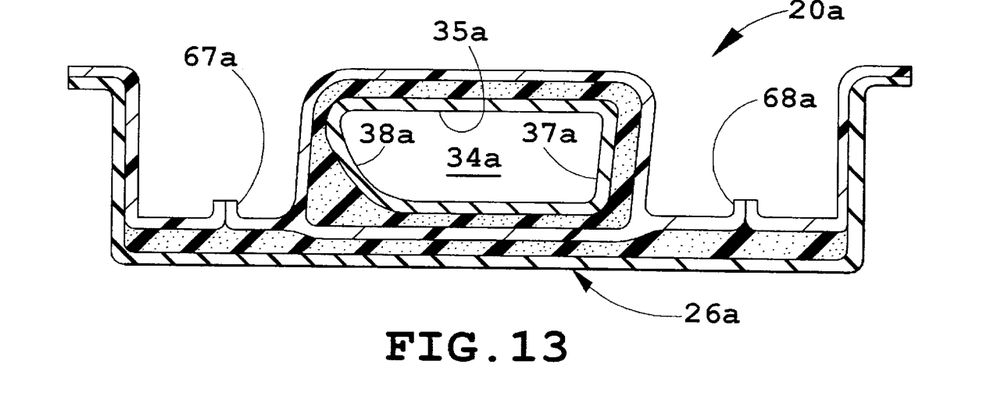
FIG. 13 is a cross sectional view taken along section line XIII—XIII in FIG. 12.

In an alternative embodiment of the invention, a modified door panel 20a is shown in FIG. 11. In door panel 20a (and in further modified door panels), similar or identical components and features to those of door panel 20 are identified by using an identical number but with the addition of a suffix such as a letter "a." Door panel 20a includes a support 21a made of a smaller support section 21a′ attached to a larger support section 21a″. The smaller support section 21a′ is small enough to allow easier molding including the handle reinforcement 26a, and further is small enough to allow positioning of cover 22 relative to smaller support section 21a′ to eliminate wrinkles in the cover 22a when forming handle-covering tubular section 24a. Smaller support section 21a′ includes segments forming the reinforcement 26a and well 34a including walls 35a–38a. Flanges 65–68 (FIGS. 12–13) extend from the edges of the smaller support section 21a′ and are used to secure smaller support section 21a′ to mating flanges on larger support section 21a″ by welding, adhesives, or other means.

In another embodiment, a door panel 20b is provided (FIG. 14) and includes a loop shaped reinforcement 26b which is screwed to a support 21b by a single screw 70 (or by multiple screws if needed). The assembly of support 21b and loop-shaped reinforcement 26b is performed prior to the step of RF welding. Notably, screws 70 can be designed to extend through support 21b and to engage the reinforcement 26b from a backside of support 21b. Attachment of cover 22b to support 21b proceeds as noted above in regard to FIGS. 5–7 and FIGS. 8–10. It is contemplated that front and rear panels 37b and 38b include integrally formed channels to receive and stabilize the loop shaped reinforcement 26b.

Figure 15:
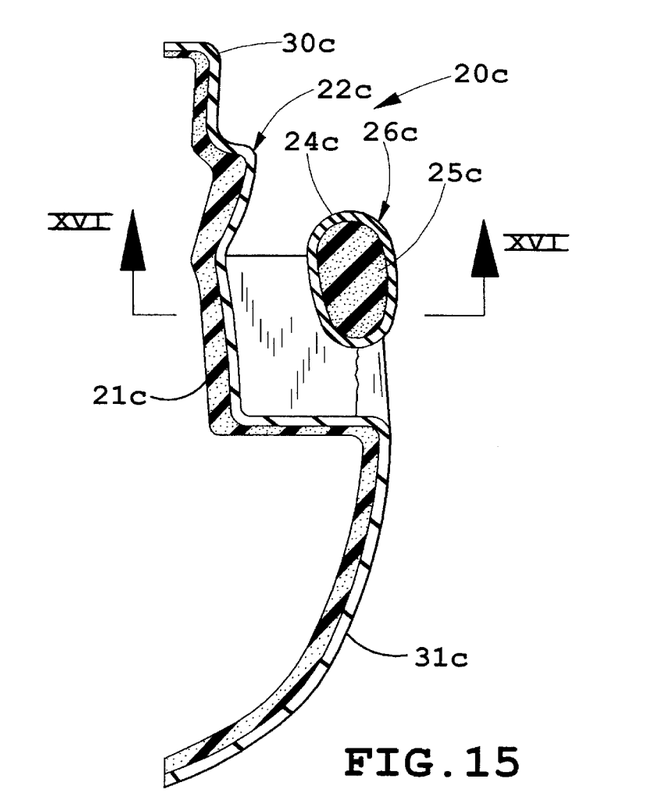
FIG. 15 is a vertical cross sectional view of yet another modified door panel including a reinforced reaction injection molded (RRIM) support member molded to an inside of the panel cover.
Figure 16:
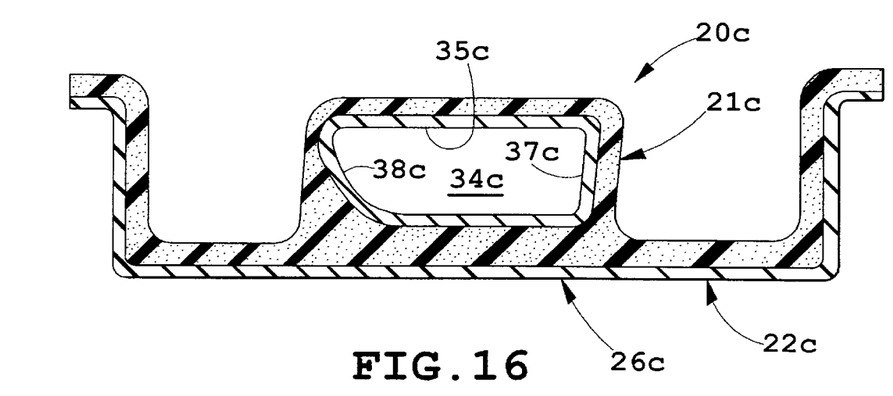
FIG. 16 is a cross sectional view taken along section line XVI—XVI in FIG. 15.

In another embodiment shown in FIGS. 15 and 16, a cover 22c is formed by the process shown in FIGS. 8–10. Thereafter, a support 21c comprising reinforced reaction injection molded material (RRIM) is molded onto the backside of the cover 22c as seen in FIGS. 15–16. The RRIM support 21c includes a reinforcement 26c having a cross sectional shape that fills the handle-covering portion 24c of cover 22c. The RRIM support 21c is filled with glass fiber or other filler material to strengthen handle 26c as required.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A vehicle door panel comprising:
  a back support having an upper section, a lower section, a formed area therebetween with opposing spaced apart structural stands and an elongated reinforcement spanning the opposing spaced apart structural stands and spaced outwardly from the formed area; and
  a one-piece flexible cover including a sheet section covering a visible side of the upper and lower sections a support-covering section covering the formed area, and a handle-covering section wrapped around the reinforcement, the handle-covering section being held together along edges of said handle-covering section with a line of welded joint material to form a tubular covering that surrounds the reinforcement to thus form an integral covered handle on the door panel, whereby the one-piece flexible cover covers the visible side of the back support including the handle of the door panel.

2. The vehicle door panel defined in claim 1 wherein said welded joint material defines a relatively smooth exterior surface characterized by an absence of a protruding parting line.

3. The vehicle door panel defined in claim 1 and further including foam material positioned between said back support and said flexible cover.

4. The vehicle door panel defined in claim 3 wherein said foam material is located between said handle-covering section and said reinforcement so that said handle provides a soft feel to a user.

5. The vehicle door panel defined in claim 3 wherein said foam material comprises flexible foam located along said welded joint material.

6. The vehicle door panel defined in claim 1 wherein said back support comprises ABS polymeric material.

7. The door panel defined in claim 1 wherein said reinforcement comprises rigid foam.

8. The vehicle door panel defined in claim 1 wherein said reinforcement comprises a separate member attached to said support.

9. The vehicle door panel defined in claim 8 wherein said reinforcement is attached to said structural stands by at least one fastener.

10. The vehicle door panel defined in claim 8 wherein said reinforcement includes a strip of stiff material attached to said structural stands.

11. The vehicle door panel defined in claim 1 wherein said reinforcement is integrally molded as a part of said back support.

12. The vehicle door panel defined in claim 11 wherein said reinforcement is integrally molded of the same material as said back support.

13. The vehicle door panel defined in claim 12 wherein said reinforcement comprises a hollow structure with an exterior wall having a thickness about the same as the thickness of said back support.

14. The vehicle door panel defined in claim 1 wherein said back support includes a relatively flat and enlarged first support, and a configured smaller support secured to said first support, the smaller support including said formed area.

15. The vehicle door panel defined in claim 14 wherein said flexible cover is configured to completely cover a visual side of both said first support and said smaller support.

16. The vehicle door panel defined in claim 15 wherein said smaller support is welded to said first support.

17. The vehicle door panel defined in claim 1 wherein said reinforcement defines a loop including a first section that is surrounded by said handle-covering section, and a second section that extends parallel to said first section adjacent said back support.

18. A method of manufacturing a door panel comprising steps of:
providing a back support having an upper section, a lower section, a formed area therebetween with opposing spaced apart structural stands, and an elongated reinforcement spanning between the opposing spaced apart structural stands and spaced from the formed area;
providing a one-piece flexible cover including a sheet section covering the upper and lower sections, and including first and second panel sections adapted to cover the formed area and further including a handle-covering section adapted to cover the reinforcement;
positioning the one-piece flexible cover on the back support with the sheet section covering a visual side of the upper and lower sections, and with the handle-covering section being wrapped around the reinforcement; and
welding portions of the handle-covering section together so that the handle-covering section is held together with a single bead of welded joint material to form an integrally covered handle on the door panel.

19. The method defined in claim 18 wherein the single bead defines a single continuous weld line in the shape of a loop.

20. The method defined in claim 19 wherein the steps of welding including RF welding.

21. The method defined in claim 18 wherein the step of welding includes RF welding.

22. The method defined in claim 18 including a step of foaming foam material between the support and the flexible cover.

23. The method defined in claim 22 wherein the step of foaming includes foaming foam material between the handle-covering section and the reinforcement.

24. The method defined in claim 18 wherein the step of providing a back support includes molding the support and also includes molding the reinforcement integrally as part of the back support.

25. The method defined in claim 24 wherein the step of molding includes molding the reinforcement and the back support of the same material and at the same time.

26. The method defined in claim 18 wherein the step of providing the back support includes molding a smaller support section and molding a larger support section, and further includes attaching the smaller support section to the larger support section.

27. The method defined in claim 26 wherein the step of welding the handle-covering portions is completed before the step of attaching the smaller support section to the larger support section.

28. The method defined in claim 18 wherein the portions of the handle-covering section are opposing panel sections located proximate each other, one of the opposing panel sections being convexly shaped, and including a step of inverting the convexly-shaped one opposing panel section so that it bows in an opposite direction from an as-molded condition.

29. The method defined in claim 18 wherein the portions of the handle-covering section are opposing panel sections located proximate each other, wherein the step of welding includes RF welding the opposing panel sections together, and including a step of removing the opposing panel sections after the step of welding to create an opening for a person's fingers under the handle of the panel.

30. A method of forming a door panel comprising the steps of:
providing a back support having first and second sections, a formed area therebetween, and a reinforcement spanning the formed area; providing a one-piece flexible cover including a sheet section covering the first and second sections, and including first and second panel sections adapted to cover the formed area and further including a handle covering section adapted to cover the reinforcement, one of the cover panel sections being convexly shaped;
inverting the one cover panel section inside-out so that the one cover panel section becomes concavely shaped and so that the one cover panel section abuts an adjacent one of the other cover panel sections;
securing the one cover panel section to the other adjacent cover panel section along a single line joinder to form a handle-covering tube on the cover; and
attaching the flexible cover to the back support including the first and second sections.

31. The method defined in claim 30 wherein the step of securing includes RF welding material of the one cover panel section to the other cover panel section.

32. Method defined in claim 30 wherein the step of providing a cover includes forming the cover by one of slush/slurry molding, vacuum forming, and injection molding.

33. The method defined in claim 30 wherein the step of providing the cover includes providing a mold for forming the skin characterized by the mold having rigid non-moving mold parts in the area of the inner, middle, and outer cover panel sections.

* * * * *

UNITED STATES PATENT AND TRADEMARK OFFICE
CERTIFICATE OF CORRECTION

PATENT NO. : 5,868,455
DATED : February 9, 1999
INVENTOR(S) : Rob E. Springer et al.

Figure 14:
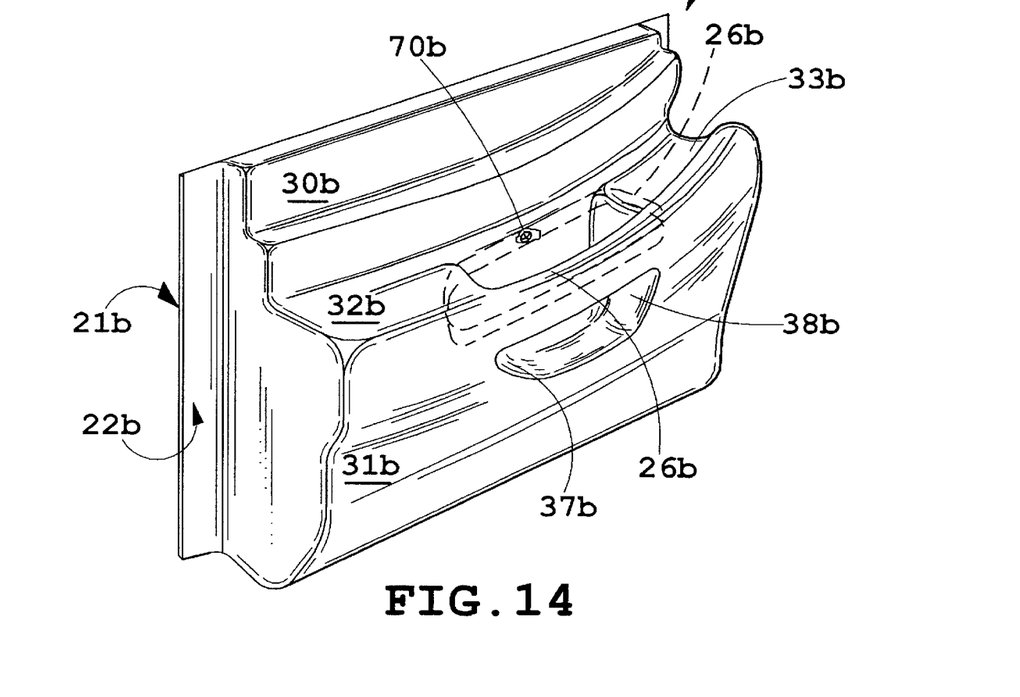
FIG. 14 is a perspective view of a further embodiment of the invention showing a door panel including a reinforcement loop attached to the underlying support.

It is certified that error appears in the above-identified patent and that said Letters Patent is hereby corrected as shown below:

Column 2, line 58, "FIG. 14 is a perspective view of a" should be a new paragraph.

Column 3, line 1, before "PREFERRED" insert --THE--.

Column 3, line 51, "shaped" should be --shapes--.

Column 6, line 4, "loop shaped" should be --loop-shaped--.

Column 6, line 14, "loop shaped" should be --loop-shaped--.

Column 6, line 40, after "sections" insert --,--.

Column 7, line 59, "including" should be --include--.

Column 8, line 41, "handle covering" should be --handle-covering--.

Column 8, line 50, after "line" insert --of--.

Column 8, line 57, "Method" should be --The method--.

Signed and Sealed this

Thirteenth Day of July, 1999

Attest:

Q. TODD DICKINSON

*Attesting Officer*   *Acting Commissioner of Patents and Trademarks*